(12) United States Patent
Brasher et al.

(10) Patent No.: US 8,967,472 B2
(45) Date of Patent: Mar. 3, 2015

(54) HIGH FREQUENCY ANTENNA FORMED ON A COMPOUND SURFACE

(75) Inventors: William E. Brasher, Clermont, FL (US); David Worral, Clermont, FL (US); William G. Wiedefeld, Clermont, FL (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 13/462,762

(22) Filed: May 2, 2012

(65) Prior Publication Data

US 2013/0292471 A1     Nov. 7, 2013

(51) Int. Cl.
*G06K 7/00*  (2006.01)

(52) U.S. Cl.
USPC .......................................... 235/439; 235/492

(58) Field of Classification Search
CPC ........... G03F 7/0002; G06K 19/07749; G06K 7/0008; G06K 19/07758; G06K 19/07779; G06K 19/07783; G06K 19/07786; G06K 7/10316; G06K 7/10336; G06K 7/10346; G06K 7/10386; G06K 17/00; G06K 19/0723; G06K 19/07336; G06K 19/0776; B65H 2511/514; B65H 2220/01; B65H 2301/331; B65H 2407/11; B65H 2553/22; B65H 2553/52; B65H 2257/11; B65H 2257/13; B65H 2557/23; B65H 2701/1313; B65H 2701/1912; B65H 29/46; B65H 31/22; B65H 43/06; B82Y 10/00

USPC ................ 235/492, 451, 439, 380, 486, 487; 340/10.1, 572.7

See application file for complete search history.

(56) References Cited

U.S. PATENT DOCUMENTS

| 6,476,775 | B1 | 11/2002 | Oberle |
| 7,169,322 | B2* | 1/2007 | Menzel et al. ............... 252/79.1 |
| 7,280,076 | B2* | 10/2007 | Ninomiya et al. ............ 343/702 |
| 8,050,771 | B2* | 11/2011 | Yamamoto et al. ............ 607/60 |
| 2005/0259083 | A1* | 11/2005 | Flowers ........................ 345/173 |
| 2006/0017571 | A1* | 1/2006 | Arnold et al. ............... 340/572.7 |
| 2007/0075145 | A1* | 4/2007 | Arendonk ...................... 235/492 |
| 2008/0129513 | A1* | 6/2008 | Bielas et al. ................ 340/572.7 |
| 2008/0208750 | A1* | 8/2008 | Chen ............................... 705/50 |
| 2009/0174557 | A1* | 7/2009 | Nikitin et al. .............. 340/572.7 |
| 2010/0072287 | A1* | 3/2010 | Kai et al. ....................... 235/492 |
| 2011/0109169 | A1* | 5/2011 | Shimamoto et al. .......... 307/104 |
| 2012/0146768 | A1* | 6/2012 | Manzi et al. ................. 340/10.1 |
| 2013/0103124 | A1* | 4/2013 | Imran ............................ 607/92 |

* cited by examiner

*Primary Examiner* — Thien M Le
(74) *Attorney, Agent, or Firm* — Patterson & Sheridan, LLP

(57) ABSTRACT

An RFID reader includes an HF antenna formed on a compound, or three-dimensional, surface. With an HF antenna so configured, the RFID reader operates with an expanded region in which a short-range RFID device can be effectively read, while still requiring close proximity between the RFID device and the RFID reader for successful communication. Consequently, the physical security of information associated with the RFID device can be maintained while simultaneously enhancing the reliability of communications between the RFID device and an RFID reader. In addition, the HF antenna can be reliably and repeatably formed into a desired three-dimensional shape with a relatively simple two-step process.

20 Claims, 4 Drawing Sheets

HIGH FREQUENCY ANTENNA FORMED ON A COMPOUND SURFACE

FIELD OF THE INVENTION

The present disclosure relates generally to radio-frequency reader and antenna systems for identifying radio-frequency identification tags and, more specifically, to a high-frequency antenna formed on a compound surface.

BACKGROUND OF THE INVENTION

Description of the Related Art

Radio-frequency identification (RFID) is a technology using radio waves to transfer data from an electronic tag, referred to as an RFID tag or RFID label, that is attached to an object. The data from the RFID tag is transferred to a reader, typically for the purpose of identifying and/or tracking the object to which the RFID tag is attached. One such RFID technology is short-range RFID or "tap technology," which relies on high frequency (HF) radio waves (13.56 MHz, for example) for "near-field" communication between the reader and the RFID tag.

The "near-field" of a transmitting antenna is a region in which there are strong inductive and capacitative effects from the currents and charges in the transmitting antenna, and generally extends only a short distance from the antenna. These inductive and capacitative effects quickly decrease in power with distance, so that near-field communications generally have an effective range on the order of about one wavelength of the radio waves emitted by the antenna. In the case of HF radio waves, the effective range of an RFID device is just a few centimeters, making such devices well-suited for transactional interactions, such as when an individual in possession of the RFID device is charged or credited funds, is allowed entry to a specific venue, etc. Due to the limited effective range of such an RFID device, explicit action on the part of the individual is required to initiate the transaction in question, thereby providing unambiguous intent and minimizing the likelihood of unintended exchanges. For example, using HF RFID technology, an individual must swipe a card containing the RFID device through a reader or tap the card against an encoded door lock to initiate the transaction or interaction. Consequently, short-range RFID technology is suitable for and commercially deployed in numerous market segments, including security access control, personnel identification, and financial payments, to name a few.

For convenience, HF RFID devices are often incorporated inside a wristband to provide privileged services and/or access to patrons, patients, workers, temporary visitors or other personnel groups. However, because the effective range of such RFID devices is limited to a few centimeters, the region near an RFID reader that provides enough RF energy to energize the RFID device in the wrist band can be quite small. Thus, unless an individual wearing such a wristband precisely positions the wristband in this small region where the RF cloud is strongest, read failures or read delays may result. In applications in which large numbers of RFID wristbands must be read quickly, such delays are highly undesirable.

Accordingly, there is a need in the art for more reliable, yet secure, communications between short-range RFID devices and corresponding RFID readers.

SUMMARY

The present disclosure addresses the above problems by providing a high frequency antenna formed on a compound surface that is formed into a non-planar shape. Advantageously, an RFID reader configured with such an antenna operates with an expanded region in which a short-range RFID device can be effectively read, while still requiring close proximity between the RFID device and the RFID reader for successful communication. In addition, the compound surface can be formed from a transparent or partially transparent material. Consequently, internal illumination in an RFID reader configured with such an antenna is readily visible, even when the compound surface conforms to a relatively large portion of the RFID reader housing.

According to one aspect of the disclosure, a radio frequency identification tag reader includes a housing and a non-planar antenna disposed inside the housing comprised of a plurality of conductive traces formed on a non-planar substrate. The non-planar substrate is configured to substantially conform to an external surface of the housing.

According to another aspect of the disclosure, a method of forming a non-planar antenna includes depositing a plurality of conductive traces on a substrate that is substantially planar and electrically insulative and performing one or more operations that cause the substrate to have a configuration that is substantially non-planar.

According to another aspect of the disclosure, an antenna includes a substrate that has a substantially non-planar configuration and is electrically non-conductive and a plurality of conductive traces formed with a conductive ink and disposed on the substrate. The plurality of conductive traces is configured with an operating frequency that matches the operating frequency of another antenna.

BRIEF DESCRIPTION OF THE DRAWINGS

So that the manner in which the above recited features of the disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

For clarity, identical reference numbers have been used, where applicable, to designate identical elements that are common between figures. It is contemplated that features of one example aspect may be incorporated in other example aspects without further recitation.

DETAILED DESCRIPTION

Figure 1:
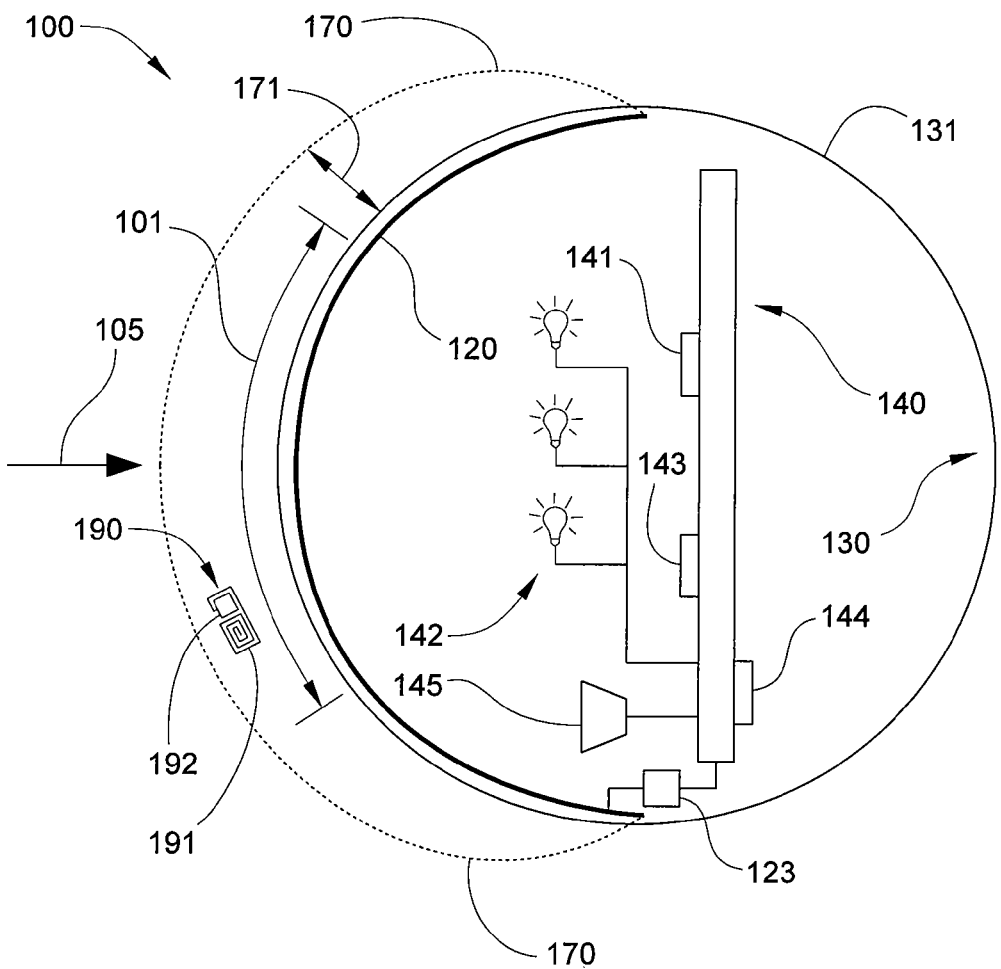
FIG. 1 illustrates a schematic cross-sectional side view of a radio-frequency identification (RFID) reader assembly that includes a high frequency (HF) antenna formed on a compound surface, according to one or more implementations of the disclosure.

FIG. 1 illustrates a schematic cross-sectional side view of a radio-frequency identification (RFID) reader assembly 100 that includes a high frequency (HF) antenna 120 formed on a compound surface 131, according to one or more implementations of the disclosure. RFID reader assembly 100 includes HF antenna 120, a housing 130, and an electronics assembly 140, and is configured to read an HF RFID tag 190 via an associated antenna 191 when HF RFID tag 190 is positioned in an operating volume 170 of HF antenna 120. For example, HF RFID tag 190 may be embedded as an inlay in a wrist band worn by a user (not shown). When the user taps RFID reader assembly 100 on or near a designated target region 101 on compound surface 131, RFID reader assembly 100 queries HF RFID tag 190 and, based on the information provided by HF RFID tag 190, grants access to a restricted location, provides the user with a privileged service, and/or initiates a specific transaction with respect to the user.

HF RFID tag 190 is a small radio transponder that may be attached to or incorporated into an object, such as an identification badge, a wristband, an article of clothing, etc. HF RFID tag 190 typically includes two primary components: antenna 191 and a chip 192. Chip 192 can be configured to store on the order of a few kilobytes of information related to the user, such as a serial number, an ID number, date of birth, name, etc. In some implementations, HF RFID tag 190 is a passive RFID tag, and therefore is powered by the radio waves received from a querying RFID reader, i.e., RFID reader assembly 100.

Housing 130 of RFID reader assembly 100 contains HF antenna 120 and electronics assembly 140 and may have any arbitrary three-dimensional shape. By way of example, housing 130 is depicted with a substantially spherical shape in FIG. 1, but in other implementations housing 130 may have any other technically feasible shape. For example, housing 130 may have a cube or other flat-sided shape, or may simulate the shape of an easily-recognized object that coincides with a desired physical theme appropriate to the location of RFID reader assembly 100. Furthermore, compound surface 131 may include a protrusion or indentation on which designated target region 101 may be disposed. Housing 130 may be mounted on any structure suitable for a desired application of RFID reader assembly 100, such as a support post, wall face, and the like.

Electronics assembly 140 comprises electronic components of RFID reader assembly 100, including RFID reader control circuitry 141, a light assembly 142, a controller 143 for light assembly 142, a communications module 144, and a speaker 145. RFID reader control circuitry 141 includes circuitry for sending and receiving radio-frequency signals via HF antenna 120. Specifically, RFID reader control circuitry 141 is configured to interrogate HF RFID tag 190 by transmitting HF radio signals to HF RFID tag 190 and receiving HF radio signals from HF RFID tag 190. RFID reader control circuitry 141 may also be configured to pass such received information digitally to a database or other computer system for storage and analysis via communications module 144, which may include networking hardware, such as a network card.

Generally, RFID reader control circuitry 141 can only activate and communicate with HF RFID tag 190 when HF RFID tag 190 is disposed in operating volume 170. Due to the limited range associated with HF RFID systems, operating volume 170 typically only extends a few centimeters away from HF antenna 120, thereby enhancing the security of a transaction that is initiated by positioning HF RFID tag 190 in operating volume 170. For example, in some implementations, operating volume 170 extends a distance 171 that is no more that about 5 cm from compound surface 131. In some applications, a distance 171 of 5 cm may be too small, leading to misreads of HF RFID tag 190. Consequently, in some implementations, distance 171 may be as much as 10 cm. In either case, such a limited range can make correct positioning of HF RFID tag 190 by a user problematic. However, when HF antenna 120 is configured according to one or more of the implementations described below, operating volume 170 is generated over a relatively large portion of compound surface 131, as shown in FIG. 1. With operating volume 170 configured in this way, a user may tap housing 130 anywhere over a relatively large portion of compound surface 131 and enable HF RFID tag 190 to be read by RFID reader assembly 100. Thus, without reducing the security associated with short-range HF communications, HF antenna 120 greatly simplifies positioning HF RFID tag 190 by a user in a way that enables RFID reader assembly 100 to successfully read HF RFID tag 190.

In some implementations, the radio frequency used by RFID reader control circuitry 141 to communicate with HF RFID tag 190 is in the so-called "high-frequency" band, which generally includes radio frequencies between about 3 MHz and 30 MHz. For example, 13.56 MHz is one commonly used frequency, generally having a read range of up to about 10 to 50 cm. Because 13.56 MHz HF communications are typically less susceptible to disruption and are already commonly used for identification and financial transactions, this frequency is well-suited for use in implementations of the disclosure. In some implementations, other radios frequencies in the HF band may be used without exceeding the scope of the disclosure. Furthermore, any technically feasible standard may be used by RFID reader control circuitry 141 to communicate with HF RFID tag 190. One such HF standard is International Organization for Standardization (ISO) 14.443, which is intended for close proximity tags, i.e., approximately 2 to 10 cm. ISO 14.443 is often used for financial transactions and identification, and allows for secure encrypted communication between an RFID tag and an RFID tag reader. Another HF standard that may be suitable for use in some implementations is ISO 15.693, which is typically used for inventory and general purpose identification.

In addition to sending and receiving radio-frequency signals via HF antenna 120, RFID reader control circuitry 141 may also be configured to control other operations of electronics assembly 140. One such operation may be the use of speaker 145 and/or light assembly 142 to provide acknowledgment to a user that HF RFID tag 190 has been successfully read by RFID reader assembly 100 and a desired transaction has taken place. For example, speaker 145 may emit an acknowledgement tone and/or play recorded instructions for a user when HF RFID tag 190 is read successfully. In another example, light assembly 142 may be used to visually acknowledge the successful reading of HF RFID tag 190, by illuminating RFID reader assembly 100 with a different color, flashing lights, etc. Light assembly 142 may include one or more of any known type of technically feasible light sources, including light-emitting diodes (LEDs), incandescent bulbs, halogen bulbs, and the like.

Figure 2:
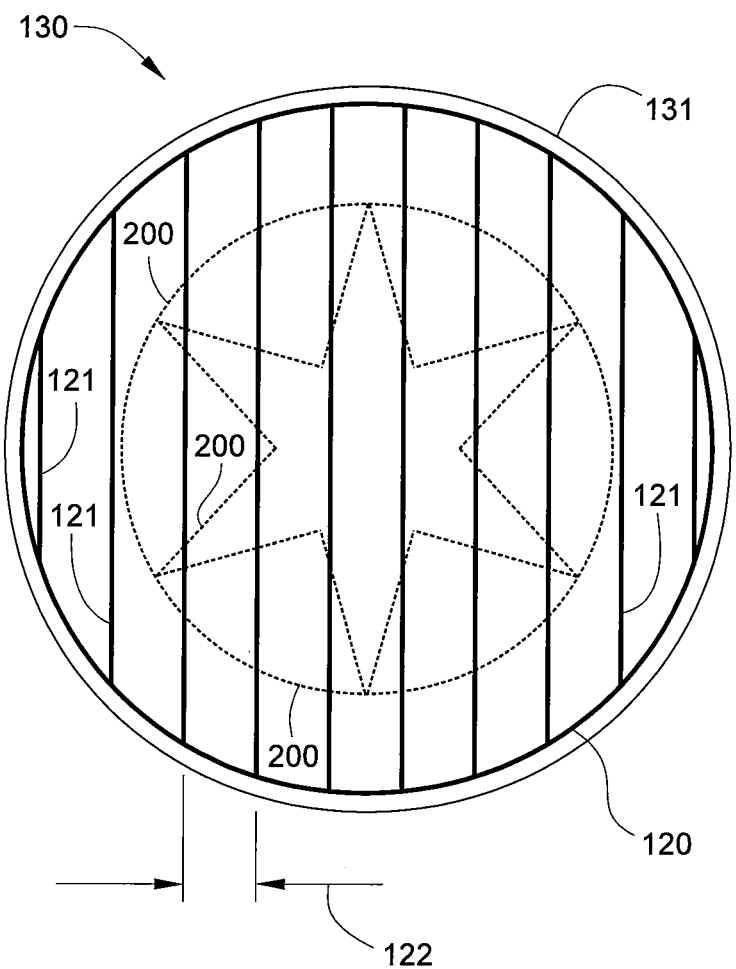
FIG. 2 is a more detailed schematic side view of the RFID reader assembly of FIG. 1, according to one or more implementations of the disclosure.

HF antenna 120 is positioned in housing 130, and, in some implementations, may be disposed near or adjacent to compound surface 131, as shown in FIG. 1. FIG. 2 is a more detailed schematic side view of the RFID reader assembly 100 of FIG. 1, according to one or more implementations of the disclosure. FIG. 2 is a side view of RFID reader assembly 100 (viewed from the direction indicated by arrow 105 in FIG. 1) showing HF antenna 120 in greater detail. Also depicted in FIG. 2 is a touch point indicator icon 200 that is disposed on compound surface 131. Touch point indicator icon 200 indicates to a user where to tap RFID reader assembly 100 in order to initiate a desired interaction or transaction when HF RFID tag 190 is incorporated into a wristband worn by the user. In the implementation illustrated in FIG. 2, touch point indicator icon 200 is depicted as a star shape centered in a circle, but in other implementations may be any design or geometric figure. In addition, touch point indicator icon 200 may include lighting, such as back lighting, surrounding indicator lights, and the like, for clearly indicating the optimal portion of compound surface 131 a user should tap to ensure proper reading of HF RFID tag 190 (not shown in FIG. 2).

Generally, HF antenna 120 includes a plurality of conductive traces 121 arranged to produce a desired operating volume 170 (indicated in FIG. 1) in which HF RFID tag 190 and HF antenna 120 can communicate via near-field communications. Conductive traces 121 may be any electrically conductive material suitable for use as the conductors of an HF antenna, including metallic wires, foil, or traces of conductive ink. In some some implementations, HF antenna 120 has a configuration that is matched to antenna 191 to minimize issues such as resonant frequency shift, impedance imbalance, and aperture interference. For example, in one implementation, HF antenna 120 and antenna 191 are configured to operate at approximately 13.56 MHz. Consequently, in some implementations, the spacing 122 between conductive traces 121 is selected so that HF antenna 120 is matched to antenna 191. Similarly, in some implementations, the dimensions of conductive traces 121, such as thickness and length, are selected so that HF antenna 120 is more closely matched to antenna 191. In some implementations, a tuning adjustment device 123 (shown in FIG. 1) may be coupled to HF antenna 120 to precisely tune HF antenna 120 to a desired frequency. While the spacing and thickness of conductive traces 121 are depicted as substantially symmetrical in FIG. 2, other implementations of HF antenna 120 may include conductive traces 121 that are asymmetrically spaced and/or have asymmetrical thicknesses in order to tune the operating frequency of HF antenna 120 and/or to generate operating volume 170 in a desired shape.

Furthermore, conductive traces 121 of HF antenna 120 are formed on a compound surface, i.e., a non-planar surface, that substantially follows the contours of compound surface 131. HF antenna 120 is therefore substantially different from more conventional planar HF antennas used in the art as reader antennas for HF RFID devices (e.g., RFID-containing credit cards, and the like), because such reader antennas are typically planar and rectangular, and are typically mounted on a printed circuit board. In some implementations, conductive traces 121 of HF antenna 120 are deposited or otherwise formed on a planar substrate that is subsequently formed into a desired non-planar, or "compound," shape. A method of forming such an implementation of HF antenna 120 is described below in conjunction with FIG. 4. For example, when the planar substrate is formed into the desired non-planar shape via vacuum forming, the planar substrate may include a thermoplastic material.

It is noted that a wide variety of materials may be used for the non-planar substrate on which conductive traces 121 are formed, including materials that are transparent or partially transparent to visible light. Consequently, conductive traces 121 may be formed on a substrate that conforms to a relatively large portion of housing 130 without preventing light emitted from an internal illumination source, such as light assembly 142, from reaching housing 130. This is in contrast to known HF antennas for RFID readers, which, in addition to being planar and unable to conform to a compound surface of an RFID reader, are typically formed on printed circuit board-type substrates that are completely opaque to visible light. Thus, in a configuration of RFID reader 100 in which HF antenna 120 conforms to a large portion of compound surface 131 of housing 130, HF antenna 120 can include a transparent substrate so that light assembly 142 illuminates housing 130 as desired during operation. For example, illumination of housing 130 can change and be seen by a user to indicate a positive read or a change in status of a transaction.

Figure 3:
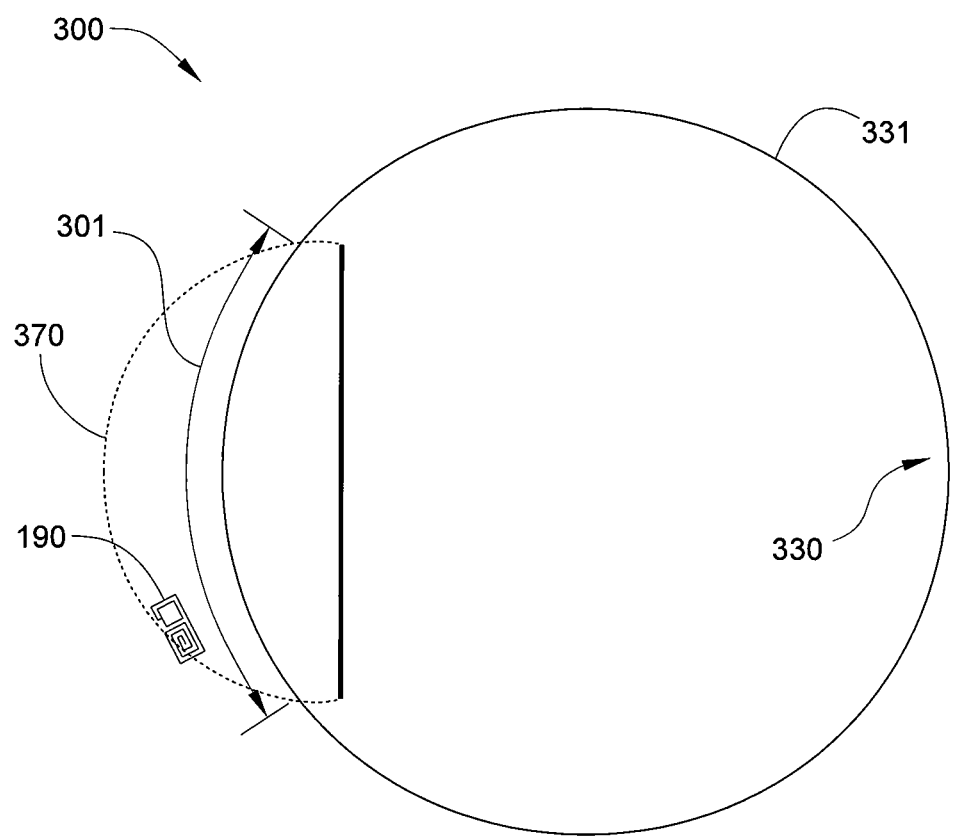
FIG. 3 is a schematic cross-sectional side view of an RFID reader assembly that includes a planar HF antenna disposed adjacent to a compound surface.

Because HF antenna 120 substantially follows the contours of compound surface 131, operating volume 170 is generated over a significantly larger portion of compound surface 131 than an operating volume formed by a conventional planar HF antenna. This difference is illustrated in FIG. 3, which is a schematic cross-sectional side view of an RFID reader assembly 300 that includes a planar HF antenna 320 disposed adjacent to a compound surface 331. Planar HF antenna 320, as depicted in cross-section in FIG. 3, is an HF antenna that has a rectangular and substantially planar configuration, and, therefore, appears as a line when viewed in cross-section. A target region 301 is disposed on compound surface 331 of a housing 330 and is provided to users as a touch point on RFID reader assembly 300. As shown, because compound surface 331 is highly non-planar, an operating volume 370 of planar HF antenna 320 is only formed over a limited portion of compound surface 331. Consequently, RFID reader assembly 300 may have difficulty reading an RFID device incorporated into a wristband when a user wearing such a wristband taps a peripheral portion of target region 301 and/or orients the tapping hand in a way that positions the wristband outside operating volume 370. In contrast, the expanded operating volume 170 for HF antenna 120 (shown in FIG. 1) ensures that HF RFID tag 190 can be read by RFID reader assembly 100 even when a user wearing a wristband that includes HF RFID tag 190 does not tap the center of target region 101. One should note that the improved ability of RFID reader assembly 100 to read HF RFID tag 190 does not result from operating volume 170 extending farther away from compound surface 131; rather, the improvement results from operating volume 170 extending over a larger portion of compound surface 131. Consequently, the security of the transaction initiated with a hand tap gesture to target region 101 by a user is maintained.

In the implementation illustrated in FIG. 1, HF antenna 120 is configured to produce an operating volume 170 that is sized for use with a passive RFID tag, i.e., an RFID device that uses the radio energy transmitted by the reader as its energy source. In other implementations, HF antenna 120 may be configured to produce a significantly larger operating volume 170 for use with an active or battery assisted passive RFID tag. An active RFID tag has an on-board battery that enables the RFID tag to periodically transmit a suitable ID signal, and a battery-assisted passive RFID tag has a small battery on board that enables the RFID tag to transmit a suitable ID signal when activated by the presence of an RFID reader. In such implementations, operating volume 170 may extend a much larger distance from compound surface 131, but one of skill in the art will appreciate that the shape of operating volume 170 can be advantageously configured by HF antenna 120 when HF antenna 120 substantially follows the contours of compound surface 131.

Figure 4:
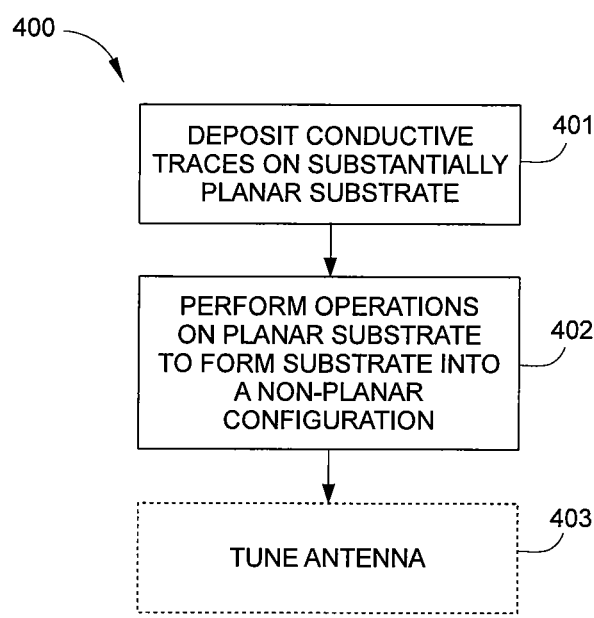
FIG. 4 is a flowchart of method steps for forming a non-planar HF antenna, according to one or more implementations of the disclosure.

FIG. 4 is a flowchart for forming a non-planar HF-antenna, according to one or more implementations of the disclosure. Although the method steps are described to form an HF antenna configured for use in RFID reader assembly 100, persons skilled in the art will understand that such an HF antenna may be configured for use in any RFID reader device without exceeding the scope of the disclosure.

As shown, a method 400 begins at step 401, where a plurality of conductive traces, such as conductive traces 121 in FIG. 1, are deposited on a substantially planar and electrically insulative substrate. In some implementations, the substrate comprises a non-conductive thermo-plastic to facilitate forming of the substrate into a compound surface in step 402, which is described below. In one example implementation, the substantially planar and electrically insulative substrate comprises a thin polyethylene sheet. Optical properties of the substrate depend on the specific configuration of RFID reader assembly 100 and, therefore, may be opaque or transparent. For example, in implementations in which RFID reader assembly 100 is illuminated internally by LED assembly 142, the substantially planar and electrically insulative substrate may be somewhat or completely transparent to visible light to allow the internal illumination to reach some or all of housing 130 during operation. Similarly, the thickness of the substrate may vary depending on the size and desired mechanical strength of HF antenna 120 as well as the amount of deformation the substrate is subjected to when being formed into a compound surface in step 402.

Conductive traces 121 are comprised of an electrically conductive material that can be deposited or otherwise formed on the substantially planar and electrically insulative substrate, including metallic wires, foil, or conductive ink. In one implementation, conductive traces 121 are formed by silk-screening or lithographically printing a conductive ink (also referred to as a polymer thick film) in the shape of conductive traces 121 onto the substrate. Any technically feasible conductive ink deposition process known in the art may be used without exceeding the scope of the disclosure. A number of conductive inks known in the art are suitable for an HF antenna, as describe herein, such as PSC-4488, available from International Microelectronics Research Corporation, and 5201 silver conductor, available from E. I. du Pont de Nemours and Company, among others. In some implementations, a conductive ink that has significant elasticity after deposition may be selected for use in step 401. Such a conductive ink can advantageously maintain continuity of conductive traces 121 after the forming process of step 402. The specific conductive ink selected for depositing conductive traces 121 may be based on the process temperature and equipment used for a specific forming process in step 402.

The width and thickness of conductive traces 121 may be selected depending on process temperature and the amount of deformation applied to the substantially planar and electrically insulative substrate in step 402. In some implementations, conductive ink used to form conductive traces 121 is deposited with a thickness of approximately 100 to 200 microns. In some implementations, in which the deformation of the substrate in step 402 includes sharp bends and/or a high strain field, the thickness of the conductive ink used to form conductive traces 121 may be greater than 200 microns. Any feasible width of conductive traces 121 may be used in the formation of HF antenna 120 without exceeding the scope of the disclosure. In some implementations, the width of conductive traces 121 is selected to produce a desired impedance matching with an antenna associated with an RFID tag, such as antenna 191. In some implementations, a minimum width of conductive traces 121 is selected to ensure continuity thereof after the deformation process of step 402 is completed.

In step 402, the substantially planar and electrically insulative substrate is formed into a non-planar configuration, i.e., a compound surface that may be an arbitrary three-dimensional shape or a combination of one or more three-dimensional shapes. In some implementations, a vacuum-forming process is used in step 402 to form the substrate with conductive traces 121 into a desired non-planar configuration. Vacuum forming is a particular thermoforming process in which a sheet of thermoplastic is heated to a forming temperature, stretched onto or into a single-surface mold, and held against the mold by applying vacuum between the mold surface and the sheet. Because conductive traces 121 are deposited on the substrate prior to step 402, the vacuum-forming process of step 402 also forms conductive traces 121 into the desired three-dimensional shape. Consequently, when vacuum-forming is implemented in step 402, the formation of conductive traces 121 into a desired three-dimensional shape that substantially follows the contours of compound surface 131 is greatly simplified.

In an optional step 403, a tuning process may be performed to more precisely tune HF antenna 120 to a specific frequency of operation that facilitates optimum performance by RFID reader assembly 100. In some implementations, the tuning process may include the use of a tuning adjustment device connected to HF antenna 120 that can fine tune the operating frequency of HF antenna 120 to a specific desired frequency of operation. In implementations in which RFID reader control circuitry 141 is an off-the-shelf device that operates at a fixed frequency, such a tuning adjustment device advantageously enables matching of the operating frequency of HF antenna 120 to that of RFID reader control circuitry 141. In some implementations, the tuning process of step 403 is performed for one or more prototype antennas, while in other implementations, the tuning process of step 403 is performed as part of the quality control portion of the manufacturing process for each HF antenna 120 that is fabricated.

In sum, implementations of the disclosure provide an RFID reader that includes an HF antenna formed on a compound, or three-dimensional, surface. With an HF antenna so configured, the RFID reader operates with an expanded region in which a short-range RFID device can be effectively read, while still requiring close proximity between the RFID device and the RFID reader for successful communication. Thus, one advantage of the disclosure is that the physical security of information associated with the RFID device can be maintained while simultaneously enhancing the reliability of communications between the RFID device and an RFID reader. Another advantage of the disclosure is that an HF antenna can be reliably and repeatably formed into a desired three-dimensional shape with a relatively simple two-step process.

While the foregoing is directed to features of the present disclosure, other and further features of the disclosure may be devised without departing from the basic scope thereof, and the scope thereof is determined by the claims that follow.

We claim:

1. A radio frequency identification (RFID) tag reader, comprising:
   an enclosure; and
   a non-planar antenna disposed within the enclosure and comprising a plurality of conductive traces formed on a non-planar surface of a substrate,
   wherein the non-planar surface is configured to substantially conform to an external surface of the enclosure to cause a predetermined increase in an operating volume associated with the external surface for reading a radio frequency identification tag relative to forming the plurality of conductive traces on a planar surface.

2. The RFID tag reader of claim 1, wherein the non-planar antenna is configured to send high-frequency signals to and receive high-frequency signals from another antenna that is disposed within the operating volume.

3. The RFID tag reader of claim 2, wherein the another antenna is associated with a RFID tag.

4. RFID tag reader of claim 2, wherein the high-frequency signals comprise radio-frequency signals in the range of about 3 MHz to about 30 MHz.

5. RFID tag reader of claim 2, wherein an impedance of the non-planar antenna is matched to an impedance of the another antenna.

6. The RFID tag reader of claim 5, wherein the plurality of conductive traces is configured to match the impedance of the non-planar antenna to the impedance of the another antenna.

7. The RFID tag reader of claim 1, wherein the non-planar antenna is configured such that the operating volume extends no more that about 10 cm from the external surface of the enclosure.

8. The RFID tag reader of claim 1, wherein the non-planar antenna is configured such that the operating volume extends no more than about 5 cm from the external surface of the enclosure.

9. The RFID tag reader of claim 1, wherein the plurality of conductive traces comprises electrically conductive ink.

10. The RFID tag reader of claim 1, wherein the non-planar surface is curvilinear.

11. The RFID tag reader of claim 1, wherein the non-planar antenna is positioned proximate the external surface of the enclosure.

12. A method of forming a non-planar antenna, the method comprising:
    depositing a plurality of conductive traces on a surface of a substrate that is substantially planar and electrically insulative, wherein a spacing between the conductive traces is selected to match an impedance of the non-planar antenna to an impedance of another antenna;
    after depositing the plurality of conductive traces, heating the substrate; and
    performing a vacuum forming process that forms the surface of the heated substrate into a non-planar configuration.

13. The method of claim 12, wherein the another antenna is associated with a RFID tag.

14. The method of claim 12, wherein depositing the plurality of conductive traces on the surface comprises depositing a conductive ink on the substrate.

15. An RFID tag reader, comprising:
    an enclosure;
    an antenna comprising:
        a surface of a substrate that has a substantially non-planar configuration and the substrate is electrically insulative and is at least partially transparent to visible light; and
        a plurality of conductive traces disposed on the surface
    a light source arranged within the enclosure such that light emitted from the light source passes through the substrate of the antenna and illuminates an image formed on an exterior surface of the surface.

16. The RFID tag reader of claim 15, wherein an impendence of the antenna is matched to an impedance of another antenna, wherein the another antenna is part of a RFID tag.

17. The device of claim 16, wherein the image provides an indication of an operating volume of the antenna in which the RFID tag is capable of communicating with the RFID reader.

18. The RFID tag reader of claim 15, wherein the surface is curvilinear.

19. The RFID tag reader of claim 15, wherein the antenna is disposed proximate to the exterior surface such that the image is within an operating volume of the antenna.

20. The device of claim 19, wherein a shape of the surface of the substrate is matched to a shape of the exterior surface.

* * * * *